United States Patent [19]

Gurley

[11] Patent Number: 5,378,246
[45] Date of Patent: Jan. 3, 1995

[54] INDIGO DYE PROCESS

[75] Inventor: Sally Gurley, Boulder, Colo.

[73] Assignee: Allegro Natural Dyes, Inc., Longmont, Colo.

[21] Appl. No.: 59,545

[22] Filed: May 10, 1993

[51] Int. Cl.$^6$ .................. C09B 67/00; C09B 61/00; C09B 7/00; D06P 1/34
[52] U.S. Cl. ........................... 8/625; 8/653; 8/646; 8/918
[58] Field of Search ................ 8/653, 625, 646, 918

[56] References Cited

U.S. PATENT DOCUMENTS

| 678 | 4/1838 | Woodcroft . | |
|---|---|---|---|
| 83,502 | 10/1863 | Iversen . | |
| 4,166,717 | 9/1979 | Fono et al. | 8/38 |
| 4,247,295 | 1/1981 | Patxot | 8/465 |
| 4,283,198 | 8/1981 | Fletcher | 8/653 |
| 4,613,336 | 9/1986 | Quinnen | 8/494 |
| 4,752,301 | 6/1988 | Koch | 8/653 |

OTHER PUBLICATIONS

Bliss, Ann, A Handbook of Dyes from Natural Materials, pp. 38-39; Charles Scribner's Sons (1981).
Yoshii, Akiko; Tanebe, Kenichi; Tari, Isao, "Studies on the dyeing behavior of indigo in nitrogen", from Chem. Abstract, CA 109(22) 192037f, 1987.

*Primary Examiner*—Paul Lieberman
*Assistant Examiner*—Margaret Einsmann
*Attorney, Agent, or Firm*—Howard & Howard

[57] ABSTRACT

An improved nonpolluting method of dyeing fibers or fabric, including natural cellulose fibers such as cotton or linen, using indigo dye. The improved process includes pretreating the fibers with a mordant solution, preferably a natural nonpolluting mordant solution. The fibers are then treated with a reduced indigo liquor in an inert atmosphere, preferably nitrogen. The indigo is then oxidized by flooding the dyed fabric with cold water. This indigo dye process can be adapted to conventional garment, package and piece dye processes and machinery, which has not been possible with existing indigo dye processes. The improved process results in a more consistent and even dyed material which is color and washfast.

16 Claims, No Drawings

INDIGO DYE PROCESS

BACKGROUND OF THE INVENTION

This invention relates to an improved process for dyeing fibers with indigo dye, including natural cellulose fibers, textile fabric and yarn. The improved indigo dye process includes premordanting the fibers and oxidizing the leuco indigo dye by flooding the fibers with cold water, thus eliminating the requirement for skying and polluting effluents. Further, the indigo dye process of this invention can be adapted to utilize conventional garment, package and piece dye machinery and processes.

Indigo has been used to dye fabric with "indigo blue" since before recorded history. The sap which oozes from the plant when bruised was applied to fabric by ancient Egyptians, Greeks and Romans. Indigo has been used in India to dye fabric for at least 4,000 years by methods which are practically identical to the methods employed today. Indigo was introduced in Europe in large quantities by the Dutch East India Company in the early 17th century.

Indigotin ($C_{16}H_{10}N_2O_2$) is the true coloring matter of indigo. When pure, indigotin forms a dark, rich blue powder or bronzy blue-colored needle crystals. The most important reaction of indigotin is its reaction with reducing agents. When subjected to a reducing agent in the presence of alkali, indigotin combines with two atoms of hydrogen and is reduced to a colorless body, known as indigo-white or the leuco form, which is insoluble in water, but dissolves in alkali, with a yellow color. This reaction may be represented, as follows:

$$C_{16}H_{10}N_2O_2 + H_2O = C_{16}H_{12}N_2O_2$$

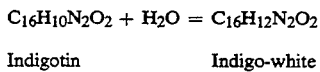

It is reoxidized to indigotin with great ease, simply by exposure to oxygen, by the following equation:

$$C_{16}H_{12}N_2O_2 + O = C_{16}H_{10}N_2O_2H_2O$$

The commercial vat method thus utilizes these reactions to dye fabric or yarn indigo blue. Commercial indigo vat dyeing is carried out in an aqueous alkali vat containing the reduced leuco form of indigo. Fibers in the form of warp yarns are dipped into the vat for a residence time sufficient to permit the fibers to absorb the desired amount of leuco dye. Following each dip, the fibers are squeezed between rolls and then carried into the open air, which is known as "skying," wherein the leuco dye is oxidized to the insoluble indigotin form in the fibers.

Oxidation of the reduced leuco form in the dip vat is troublesome in all vat dyeing, but is a particular problem with indigo dyeing. The oxidation occurs where the dye liquor contacts the air, especially in the region of the squeeze rolls where multiple interfaces are generated, exposing large areas of leuco dye liquor to the air as the dye liquor drains from the squeeze rollers. This oxidation results in a significant loss of dye liquor and formation of floating scum of oxidized insoluble dye. U.S. Pat. No. 4,283,198 discloses an "inert atmosphere" indigo dye process which includes an enclosure of the air-liquor interface of a leuco indigo bath comprising sodium hydrosulfite and sodium hydroxide, which results in consumption of oxygen at the enclosed interface. However, the enclosure cannot be gas tight and would not result in an inert gas enclosed process. Further, the process is impractical for commercial indigo dyeing operations and thus does not solve the problems associated with the use of natural indigo dyes.

Synthetic indigo has essentially replaced natural indigo in commercial dyeing. The production of synthetic indigo requires the use of toxic materials, including sodium cyanide, formaldehyde, sodium and potassium hydroxide and synthetically produced aniline, which are carried through to the cloth. The waste products include the unspent toxic chemicals described above, plus sulfuric and hydrochloric acid, sodium dioxide and insoluble salts. Thus, there has been a renewed interest in the use of natural indigo; however, the prior indigo dye methods result in dyed fibers or fabric which are not nearly as wash and lightfast as synthetic dyes and naturally dyed colors are difficult to reproduce using known techniques.

Thus, there remains an important need for a process for dyeing fibers, particularly cellulose fibers, which is suitable for natural indigo and which produces a consistent natural color, which is wash and lightfast. The process for dyeing textile fibers with indigo dye of this invention is suitable for natural indigo, thus avoiding the problems associated with synthetic indigo dyes, including toxic wastes. The process of this invention may also be utilized to dye over other colors, producing a full palette of consistently reproducible natural colors which are wash and lightfast.

SUMMARY OF THE INVENTION

The improved process for dyeing textile fibers with indigo dye of this invention is suitable for dyeing natural cellulose fibers, including, for example, cotton and linen fabrics, and synthetic textiles, including, for example, Rayon ® and Tensel ™. The indigo dye process of this invention is particularly, but not exclusively adapted for use with natural indigo dye while avoiding many of the problems associated with the use of vegetable dyes, including reproducible colors which are wash and lightfast. The process of this invention includes pretreating the fibers, which may be in the form of yarn, fabric or a garment, with a mordant solution. It will be understood by those skilled in the art, that premordanting is not used for indigo dyeing. In the most preferred process of this invention, a natural nonpolluting mordant solution is utilized, such as the aqueous solution of alum and soda ash disclosed in my copending application for U.S. patent Ser. No. 08/059,544, filed May 10, 1993, the disclosure of which is incorporated herein by reference.

After the fibers are wetted out and drained, the pretreated or premordanted fibers are placed in a contained inert atmosphere, which is substantially free of oxygen. In one preferred embodiment of the invention, the fibers are placed within an enclosure which is flooded with nitrogen gas under pressure, displacing oxygen from the fibers and the enclosure. The fibers are then treated with an aqueous indigo dye liquor containing indigo in the reduced leuco state in the contained inert atmosphere. The fibers are agitated in the reduced indigo dye liquor, such that the fibers to be dyed are saturated with the reduced indigo. Finally, after draining the aqueous solution of indigo dye, the fibers are flooded with cold water, wherein the indigo blue or indigotin is regenerated in and upon the fibers, which then become permanently dyed. The treatment of the fibers with indigo may be repeated several times to produce the desired intensity of indigo blue.

The indigo dye liquor is preferably introduced into the contained indigo dye vat from a holding tank after the fibers are flooded with inert gas and stripped of oxygen, as described above. The holding tank is prepared by filling the tank with water, then stripping the water in the holding tank of oxygen by adding sodium hydrosulfite to the water, and then introducing indigo dye liquor in the reduced leuco state, preferably below the surface of the water in the tank. A conventional floating cover may be used on the holding tank to prevent oxidation of the reduced indigo. The reduced indigo dye liquor may be made by conventional processes, wherein indigotin or indigo blue concentrate is added to a weak aqueous solution of sodium hydroxide which includes a reducing agent, such as sodium hydrosulfite.

The pretreatment of the fibers is preferably carried out using an aqueous solution of a natural nonpolluting mordant solution. The most preferred mordant solution comprises an aqueous solution of alum or potassium aluminum sulfate $KAl(SO_4)_2.12H_2O$ and soda ash $Na_2CO_3$. As described more fully in my copending United States patent application, the natural mordant solution is preferably prepared by adding alum to an aqueous solution of soda ash in water, which is then agitated and heated to a temperature of about 150° F. This forms an aqueous colloidal suspension of aluminum hydroxide. The pretreatment of the fibers with this nonpolluting aqueous mordant solution results improved dyed fibers, particularly with natural indigo dye, as described herein.

The improved process for dyeing textile fibers with indigo of this invention produces permanently dyed fibers and fabrics or textiles which are light and washfast and which produces reproducible natural colors. As described, the use of natural indigo substantially reduces the use of toxic chemicals and waste. Thus, the natural indigo dye process of this invention solves many of the problems associated with synthetic dyes. As described more fully herein, the indigo dye process of this invention may be used to dye fibers with natural indigo dyes using conventional package and garment dye processes and machinery. Further, the indigo dye process of this invention avoids the problems associated with indigo vat dyeing, including the formation of a scum of oxidized insoluble indigo blue on the surface of the dye vat. Finally, the process of this invention may be utilized to dye cellulose fibers with indigo, including cotton and linen, which has been found to be particularly difficult by the textile industry using conventional processes. Other advantages and meritorious features of this invention will be more fully understood from the following description of the preferred embodiments of the indigo dye process of this invention which follows, and the appended claims.

DETAILED DESCRIPTION OF THE INDIGO DYE PROCESS

As described above, the indigo dye process of this invention is particularly, but not exclusively adapted for dyeing natural cellulose fibers, including cotton and linen. The principal commercial use of indigo dye at present is dyeing denim yarn for jeans. Denim is a double twilled cotton fabric; however, it is not possible to dye cotton fabric with indigo using existing processes. Instead, cotton yarn is dyed with indigo in a vat process, as described above.

The indigo dye process of this invention may be easily adapted to dye fibers using conventional garment, package and piece dye equipment and processes, which has not been possible with existing indigo dye processes. In a package dye apparatus, for example, the yarn is wound on a porous mandrel or bobbin to form a cone of continuous yarn. An aqueous solution of synthetic dye liquor is then forced under pressure into the porous mandrel and out through the yarn cone. This important commercial package dye process has, however, been limited to synthetic dyes because indigo dye does not have sufficient uptake to dye the yarn in the cone and present processes require skying, as described above. Similarly, conventional commercial garment dye equipment arid processes are not suitable for indigo dyes.

The preferred indigo dye process of this invention includes pretreatment of tile fibers with a nonpolluting aqueous mordant solution or premordanting. As will be understood by those skilled in the art, the present indigo dye processes do not use mordants and the yarn is not pretreated for dye uptake. The most preferred mordant for the indigo dye process of this invention is an aqueous solution of alum or potassium aluminum sulfate $(KAl)(SO_4)_2(.12H_2O)$ and soda ash $(Na_2CO_3)$. Although it is believed that other mordant solutions may be used to pretreat the fibers using the indigo dye process of this invention, this mordant solution has been found to be particularly advantageous with the process of this invention. The most preferred mordant solution comprises a colloidal suspension of aluminum hydroxide in aqueous solution, wherein the concentration of alum is about seven times the concentration of soda ash, in weight percent. The preferred colloidal suspension of aluminum hydroxide may be formed by adding alum slowly to an aqueous solution of soda ash while agitating the solution, then heating the solution to about 150° F.

The fibers to be dyed are then pretreated with the mordant solution by immersing the fibers in the mordant solution, preferably a temperature of about 120° to 160° F. for about an hour. The fibers may be in the form of a yarn, as in the present indigo processes, or tile fibers may be in the form of a garment, such as a shirt, dress or a pair of jeans, a piece of textile fabric, or the fibers may be wound on a porous mandrel, such as used in a package dye machine. In the most preferred method of pretreating the fibers, the fibers are treated in temperature stages, first at a lower temperature of, for example, about 120° F. for about 20 minutes, then at a higher temperature of about 140° F. for about ten minutes. The solution is then heated to about 165° F. and the fibers are agitated for about 45 minutes. It has been found that this staged pretreatment process results in greater dye uptake. Following the premordanting, the fibers are rinsed thoroughly and preferably dried.

The pretreated fibers are then dyed with indigo dye using the indigo dye process of this invention. The fibers are preferably dyed in a sealed or contained atmosphere because the fibers are preferably dyed in an inert atmosphere which functionally removes oxygen from the fibers. A sealed atmosphere for the purposes of the indigo dye process of this invention can be obtained using a commercial or industrial washing machine which has a controlled atmosphere. As will be understood, however, such commercial washing machines generally do not have a totally sealed chamber, which is not required for the indigo dye process of this invention. It is possible, however, to dye the fibers in an inert atmosphere using commercially available industrial washing machines by flooding the fibers with an inert gas and maintaining a slight pressure of an inert gas, such as nitrogen. A computer controlled system, wherein the liquid and gas influents, temperature and agitation cycles can be preprogrammed and controlled also preferred, but not required. A suitable industrial washer which may be utilized for the indigo dye process of this invention is the Unimac Washer Extractor of Unimac Corp.

The indigo dye liquor is preferably introduced into the contained inert atmosphere containing the pretreated fibers from a holding tank. The indigo holding tank includes water and indigo dye in the reduced leuco state, as described above. The indigo dye holding tank may be prepared by filling the tank with water, then stripping the oxygen from the water by adding sodium hydrosulfite ($Na_2S_2O_4$). The reduced indigo is then introduced into the holding tank below the surface of the water. The reduced indigo dye liquor may be prepared by conventional methods, generally as follows. The indigotin or indigo blue concentrate is added to a weak aqueous solution of sodium hydroxide which has been treated with a reducing agent such as sodium hydrosulfite. The indigotin is thus reduced to indigo white or the reduced leuco state, as described above. The holding tank is thus ready for introduction into the process, as now described.

The pretreated fibers to be dyed are preferably first wetted out. This can be accomplished by rinsing the fibers in warm water preferably containing a wetting agent, such as "Ecowet" wetting solution available from Southeast Chemical Corp. The wetting solution may also contain sodium hydrosulfite, but an oxygen stripping agent is not required. The fibers are then flooded with an inert gas, such as nitrogen, to strip oxygen from the fibers and contain the fibers in an inert atmosphere as described. Where the fibers are dyed in an industrial washer, as described above, a nitrogen pressure of about 5 psi over atmospheric pressure is maintained to contain the fibers in an inert atmosphere. The content of the indigo dye holding tank is then introduced into the dye chamber and the fibers are agitated in the controlled inert atmosphere. In a typical application, the fibers are agitated at a temperature of about 100° F. for about 10 minutes or sufficient time for the fibers to take up the indigo dye. If the fibers are not premordanted, the fibers must be treated for a longer period of time and the dye uptake will be significantly reduced. Further, the dyed fibers will not be lightfast. The dye liquor is then drained while maintaining the inert atmosphere, as described.

Finally, the reduced indigo dye is oxidized in the process of this invention by flooding the fibers with cold water. Cold tap water having a temperature of less than about 90° F. has been found to be very suitable for the oxidation step. Cold water is added to cover the fibers and the fibers are agitated for about 15 minutes or a time sufficient to fully oxidate the reduced indigo to the indigotin state, as described above. The method of this invention thus eliminates the skying step, which has been a problem with commercial indigo vat dyeing processes and permits the use of the indigo dye process of this invention in commercial package, garment and piece dye machinery.

For example, the indigo dye process of this invention may be used in a conventional package dye apparatus by first premordanting the yarn on the mandrel or bobbin by forcing the aqueous mordant solution through the porous mandrel and the yarn wound on the mandrel. The yarn is then rinsed by forcing warm rinse water through the bobbin and the yarn is then dried. An aqueous solution of reduced indigo dye, which has been prepared as described above, is then forced through the mandrel while the bobbin is maintained in an inert atmosphere, as described. Finally, cold water is pumped under pressure through the mandrel to oxidize the indigo dye.

The indigo dye process of this invention may be repeated to increase the dye uptake on the fibers and produce a deeper shade of blue. That is, the dyed fibers are again treated with indigo dye in the reduced leuco state in an inert atmosphere, as described above. The fibers are then washed in cold water to oxidize the reduced leuco indigo indigotin, forming a deeper shade on the fibers. As will be understood by those skilled in the art, indigo dye is very important for not only to produce a blue color, but also for various shades of purple, gray, browns and even black. The indigo dye process of this invention is suitable for "natural" indigo derived from indigo plant material, but also for genetically produced indigo available from Genencore Corp. or synthetic indigo.

Having described the indigo dye process of this invention, the following is an example of an application of this process used in dyeing garments, namely mens and womens shirts and womens dresses made of cotton fiber. First, a premordant solution was made for pretreating the fibers, as described above. A quantity of premordant solution was prepared for treating 9,100 gms of cotton textile fiber or about 20 pounds. First, a solution of soda ash in water was prepared which contained 2% of the weight of the fibers to be treated of soda ash or 182 gms. The soda ash was added to 5 gallons of warm water and the water was stirred to dissolve all of the soda ash. As used herein, warm water has a temperature of about 80° to 100° F. 15% of the weight of the fibers of powdered alum or 1,365 gms (about 3 pounds) was then added slowly to the aqueous solution of soda ash. The alum must be added slowly to avoid flashing, although the solution will foam as the alum added. The solution is then heated to a temperature of about 150° F. while the solution is stirred or agitated. A colloidal suspension of aluminum hydroxide begins to form at a temperature of about 140° F. The mordant solution is now ready for use in pretreating the fibers.

Twenty pounds of cotton garments to be dyed were then placed in an industrial "Unimac Washer Extractor" and the fibers were thoroughly wetted out with warm water containing 40 ml "Ecowet" commercial wetting agent. One-half of the premordant solution was then added and the solution was heated to 120° F. and agitated for about 10 minutes. The remainder of the mordant solution was then added and the temperature was raised to 140° F. and agitated for 10 minutes. The temperature was then raised to 165° F. and agitated for 45 minutes. The temperature was then reduced to 120° F., the mordant solution was drained, the garments thoroughly rinsed with warm water, drained and dried, using the dry cycle of the industrial washer.

The pretreated or premordanted cotton fabric was now ready for dyeing with indigo dye. The indigo dye holding tank was then prepared by adding 40 gallons of warm water to the tank. 24 gms of sodium hydrosulfite was then added to the water to strip oxygen from the water. 1.5 gallons of indigo dye liquor in the reduced leuco state was then added to the holding tank below the surface of the liquid in the tank. As described above, the reduced indigo dye liquor may be produced by conventional methods, wherein commercially available liquid indigotin is added to a weak aqueous solution of sodium hydroxide and a reducing agent having a PH of about 8.7.

The 20 pounds of pretreated cotton garments were then wetted out with warm water containing about 40 ml of "Ecowet" commercial wetting solution. Following draining of the wetting solution, the fibers were agitated and the chamber was flooded with nitrogen for a few minutes to remove oxygen from the chamber and the cotton garments. As described, the process of this example was conducted in a Unimac Washer Extractor having a drum rotatable on a horizontal axis to agitate the fibers or garments.

The content of the indigo holding tank was then emptied into the chamber and the garments were agitated for about 10 minutes in the aqueous solution of reduced indigo dye in the contained inert atmosphere. The aqueous indigo dye solution was then drained and the chamber was immediately filled with cold water and agitated for about 10 minutes to oxidize the indigo, as described above. The indigo dye process was then repeated to produce a natural indigo blue of the desired shade.

The indigo dyed fabrics and yarn produced by the indigo dye process of this invention are both light and washfast. The American Association of Textile Colorists and Chemists has developed standard Lightfast and Washfast tests for comparison of dyes and dye processes. Fabrics and yarns dyed by the indigo dye process of this invention rated about 4.5 to 5 out of a possible 5 in such tests. Thus, the indigo dye process of this invention compares very favorable to dyed fabrics using synthetic dyes and the process is suitable for commercial application. Further, the indigo dye process of this invention does not produce toxic or polluting effluents, which is a serious problem with synthetic dyes and existing commercial indigo processes. Finally, the indigo dye process of this invention requires significantly less heat energy than conventional processes, making the indigo dye process of this invention environmentally sound.

As will be understood by those skilled in the art, various modifications may be made to the indigo dye process of this invention within the purview of the appended claims. For example, the method of this invention is not limited to premordanting or the disclosed premordant solution, which is, however, preferred. Further, other inert gases may be used to prevent oxidation of the reduced indigo in the dye tank or chamber. However, nitrogen is relatively inexpensive and nonpolluting. Finally, the indigo dye process of this invention may be used to produce a wide variety of hews or colors, particularly when used in combination with other dyes. Having described the indigo dye process of this invention, the invention is now claimed, as follows.

I claim:

1. A method of dyeing fibers with indigo dye comprising the following steps:
    wetting the fibers to be treated with an aqueous solution and then removing excess water; subsequently treating the wetted fibers with inert gas in an enclosed contained atmosphere, displacing oxygen from said fibers and said enclosed contained atmosphere;
    introducing an indigo dye liquor containing indigo in its reduced leuco state into said contained atmosphere and agitating said fibers in contact with said indigo dye; and
    draining said indigo dye liquor from said enclosed contained atmosphere and flooding said fibers with cold water, thereby oxidizing said indigo dye on said fibers.

2. The method of dyeing fibers with indigo dye as defined in claim 1, wherein said inert gas is nitrogen and said method includes introducing nitrogen gas under pressure into said contained atmosphere, displacing oxygen from said fibers and said contained atmosphere and forming an inert atmosphere surrounding said fibers prior to introducing said indigo dye liquor.

3. A method of dyeing fibers with indigo dye as defined in claim 1, wherein said method further includes pretreating said fibers with an aqueous mordant solution prior to treating said fibers with inert gas.

4. The method of dyeing fibers with indigo dye as defined in claim 1, wherein said method includes premordanting said fibers with an aqueous colloidal solution of aluminum hydroxide, then draining said aqueous colloidal solution, prior to treating said fibers with inert gas.

5. The method of dyeing fibers with indigo dye as defined in claim 1, wherein said fibers are wound on a mandrel or bobbin and said method includes then wetting said fibers on said mandrel or bobbin then treating said fibers with an inert gas on said mandrel or bobbin in said contained atmosphere, then forcing said indigo dye liquor through said fibers on said mandrel or bobbin contained in said inert atmosphere, and finally flooding said fibers with cold water, oxidizing said indigo dye on said fibers.

6. The method of dyeing fibers with indigo dye as defined in claim 1, wherein said fibers have been formed into a knitted or woven fabric or garment, said method including wetting said fabric or garment with water and a wetting solution by immersing said fabric or garment and draining excess water and solution, then treating said fabric or garment with an inert gas in an enclosed container, displacing oxygen from said fibers and said container by flooding inert gas under pressure into said enclosed container, then introducing indigo dye in its reduced leuco state into said container while maintaining said inert atmosphere, and finally flooding said fabric or garment with cold water, oxidizing said indigo dye on said fibers.

7. The method of dyeing fibers with indigo dye as defined in claim 6, wherein said fibers are natural cellulose fibers.

8. A method of dyeing fibers with indigo dye, comprising the following steps:
    pretreating said fibers with an aqueous mordant solution by immersing said fibers in said aqueous mordant solution and draining said solution;
    treating the wetted fibers with inert gas in an enclosed container by introducing inert gas into said enclosed container under pressure, displacing oxygen from said fibers and said enclosed container;
    introducing an indigo dye liquor containing indigo dye in its reduced leuco state into said enclosed container while maintaining an inert atmosphere in said enclosed container and agitating said fibers in contact with said leuco dye; and draining said indigo dye from said enclosed container, then flooding said fibers with cold water, thereby oxidizing said indigo dye on said fibers.

9. The method of dyeing fibers with indigo dye as defined in claim 8, wherein said method includes premordanting said fibers with an aqueous colloidal solution of aluminum hydroxide and draining said aqueous solution, then wetting said fibers with an aqueous solution and removing excess water prior to treating the wetted fibers with inert gas in said enclosed container.

10. The method of dyeing fibers with indigo dye as defined in claim 8, wherein said inert gas is nitrogen and said method includes introducing nitrogen gas under pressure into said enclosed container, thereby displacing oxygen from said fibers and said enclosed container and forming an inert atmosphere in said enclosed container.

11. The method of dyeing fibers with indigo dye as defined in claim 8, wherein said fibers are wound on a mandrel or bobbin and said method includes wetting said fibers on said bobbin, then treating said fibers with an inert gas on said bobbin in said enclosed container, then forcing indigo dye through said fibers on said bobbin contained in said enclosed container while maintaining said inert atmosphere, and finally flooding said fibers with cold water, oxidizing said indigo dye on said fibers.

12. The method of dyeing fibers with indigo dye as defined in claim 8, wherein said fibers are first made into a fabric or garment, said method including wetting said fabric or garment with water and a wetting solution following pretreatment of said fabric garment with an aqueous mordant solution by immersing said garment and draining said water and wetting solution, then treating said garment with an inert gas in said enclosed container, displacing oxygen from said fibers and said enclosed container by flooding inert gas under pressure into said enclosed container, then introducing said indigo dye liquor into said container.

13. A method of dyeing a garment or fabric with indigo dye, comprising the following steps:

pretreating said fabric or garment with an aqueous mordant solution by immersing said fabric or garment in said aqueous mordant solution and draining said solution;

treating the wetted fibers with inert gas in an enclosed contained atmosphere, displacing oxygen from said fibers and said contained atmosphere;

introducing an indigo dye liquor containing indigo dye in its reduced leuco state into said contained atmosphere, while maintaining an inert atmosphere and agitating said fabric garment in contact with said indigo dye; and draining said indigo dye liquor from said contained atmosphere and flooding said fabric or garment with cold water, oxidizing said indigo dye on said garment fibers.

14. A method of dyeing a fabric or garment with indigo dye as defined in claim 13, wherein said mordant solution comprises an aqueous colloidal solution of aluminum hydroxide.

15. The method of dyeing a fabric or garment with indigo dye as defined in claim 13, wherein said method includes treating said fabric or garments with an inert gas by introducing nitrogen gas under pressure into an enclosure containing said garment, displacing oxygen from said garment fibers and said enclosure and forming an inert atmosphere in said enclosure, then introducing said indigo dye liquor into said enclosure while maintaining said inert atmosphere and agitating said fabric or garment in contact with said indigo dye, then draining said indigo dye from said enclosure and flooding said enclosure with cold water, oxidizing said indigo dye on said fibers.

16. The method of dyeing a fabric or garment with indigo dye, as defined in claim 13, wherein said method includes treating said fabric or garment with sodium hydrosulfite following treating said fabric or garment with said aqueous mordant solution to strip oxygen from said fabric or garment.

* * * * *